Sept. 6, 1966 F. KRAMER 3,270,835
DEVICE FOR SUPPRESSING SOUND AND HEAT PRODUCED
BY HIGH-VELOCITY EXHAUST JETS
Filed June 16, 1964 4 Sheets-Sheet 1

INVENTOR.
FRITZ KRAMER
BY
Wayland H. Riggins
ATTORNEYS

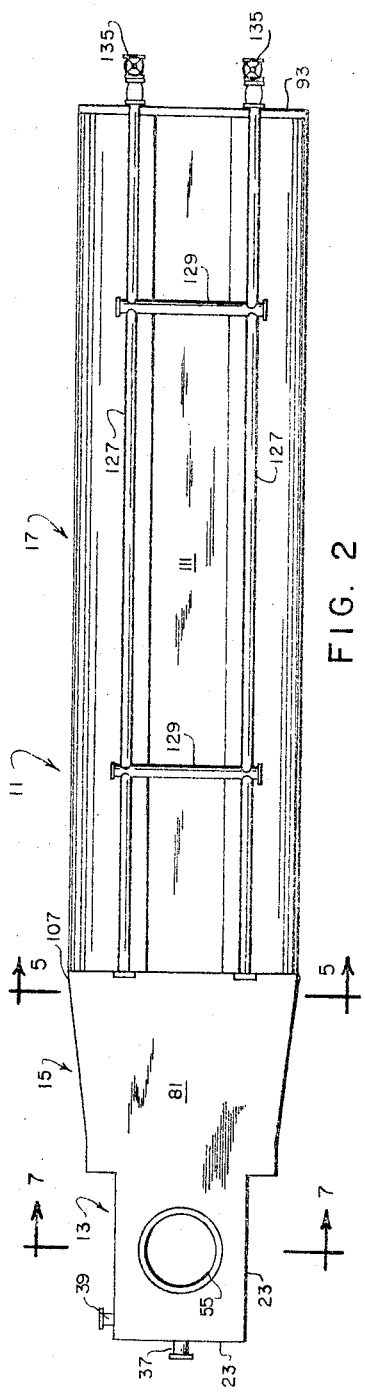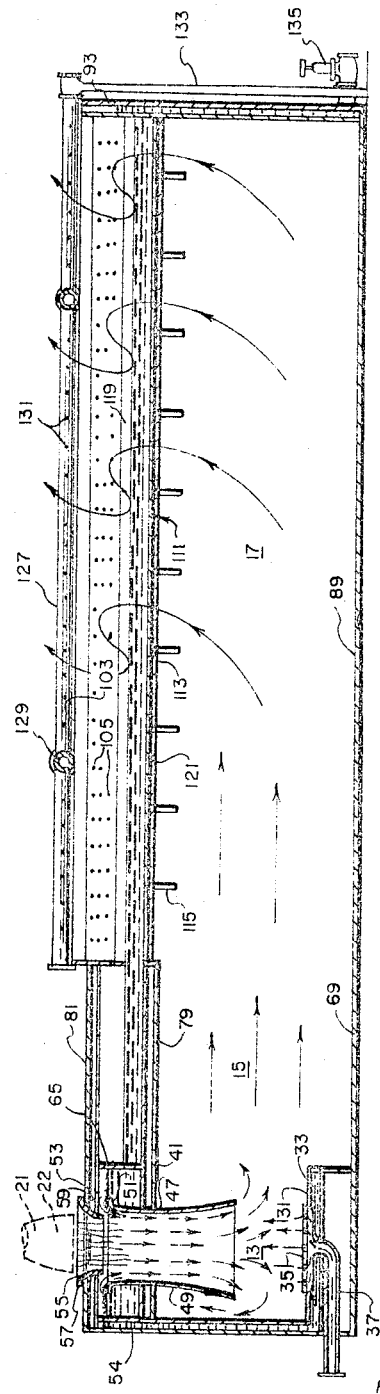

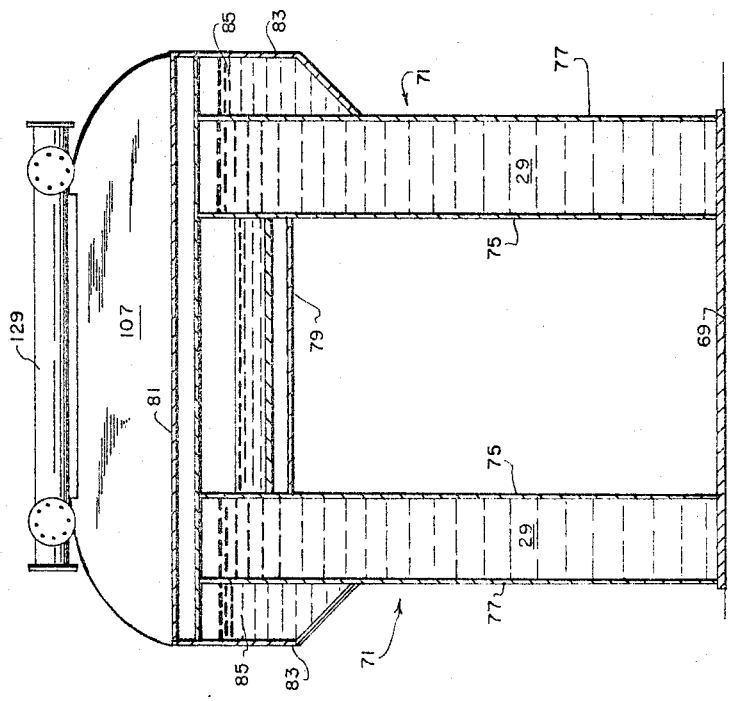
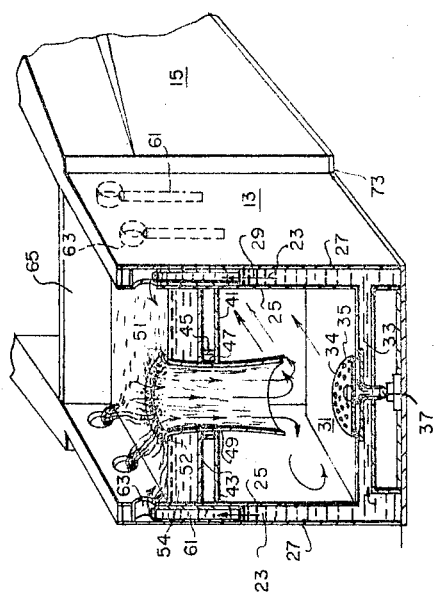
FIG. 5
FIG. 4
INVENTOR.
FRITZ KRAMER
BY
ATTORNEYS

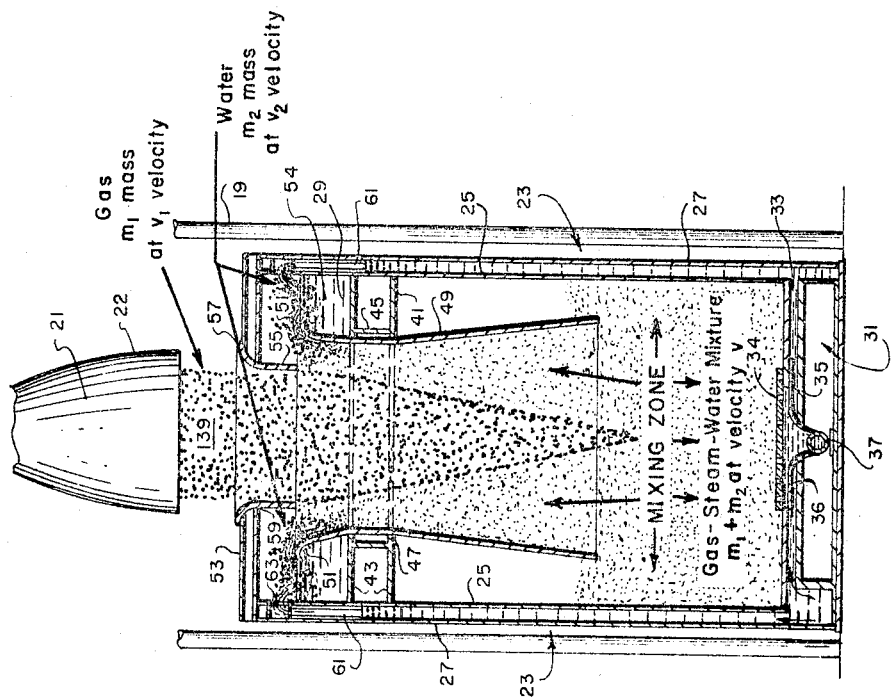

United States Patent Office 3,270,835
Patented Sept. 6, 1966

3,270,835
DEVICE FOR SUPPRESSING SOUND AND HEAT PRODUCED BY HIGH-VELOCITY EXHAUST JETS
Fritz Kramer, Huntsville, Ala., assignor to the United States of America as represented by the Administrator of the National Aeronautics and Space Administration
Filed June 16, 1964, Ser. No. 375,674
8 Claims. (Cl. 181—52)

The invention described herein may be manufactured and used by or for the Government of the United States of America for governmental purposes without the payment of any royalties thereon or therefor.

This invention relates generally to sound and heat suppression and more particularly to a device and method for suppressing the sound and heat produced by the exhaust jet issuing from reactive propulsion engines.

A difficult problem associated with the development and operation of high-thrust engines is that of reducing to a tolerable level the sound generated by the exhaust jet of these engines. The huge rocket boosters of today and the larger ones of the future require engines having tremendous thrust capacity. Large rocket boosters comprise several extremely powerful engines operating simultaneously. When these engines are operating, such as in testing, the sound produced thereby is so intense as to constitute a hazard to surrounding people and property.

The high sound intensity is very annoying to people, and may be damaging not only to the ear but also to other body organs and tissues that are sensitive to high-intensity vibrations. The propagation of the high-intensity noise can also produce costly and dangerous structural damage such as cracked concrete, broken glass, and cracked plastic, and can induce malfunction or cause destruction of delicate flight equipment and test equipment instruments due to fatigue failure phenomena. These effects are not restricted to the immediate vicinity of the jet but exist at relatively great distances since the low frequency vibrations are attenuated more slowly than the high frequency vibrations in passing through the atmosphere. Certain atmospheric conditions may even channel or focus the sound waves into localized areas.

Another problem connected with the operation of high-thrust engines is that of cooling the exhaust jet. Upon exit from the jet nozzle into the atmosphere the temperature of the exhaust jet is normally about 3,000° F.—well beyond the melting point of steel. A highly effective cooling means is necessary to prevent damage to the test stand, the sound suppressor itself, and other equipment in the vicinity.

Prior devices for suppressing the sound and heat produced by jet engines utilize a variety of techniques such as diffusion, muffling and absorption of the sound as well as the introduction of a water spray into the exhaust jet for reducing its temperature and velocity. However, the size and thrust capacity of rocket engines has been vastly increased and the problem of coping with the sound and heat of jet engines in the past has been relatively minor in comparison to the problem associated with the large rocket engines and the boosters currently under test and development. Consequently, a major advance in the technique of sound and heat suppression is now required. Since the intensity of the sound field produced by a jet issuing into the atmosphere is directly related to the velocity or kinetic energy of the jet, a superior means and method for reducing the jet velocity is necessary. It is desirable for optimum efficiency that the velocity reducing means also act as an effective agent for reducing the temperature of the jet.

Accordingly, it is a general object of this invention to provide an improved means and method for suppressing the sound and heat produced by the exhaust jet issuing from reactive propulsion engines.

A more specific object is to provide a superior means and method for reducing the velocity and temperature of the exhaust jet issuing from reactive propulsion engines.

Another object is to provide a sound suppressor which attains the degree of effectiveness and efficiency necessary to permit operation of ultra-high-thrust rocket engines near populated areas without hazard or serious annoyance to people or property.

A further object is to provide a sound and heat suppressor which can be built without requiring pumps, drive motors, high pressure lines, valves and other control devices, or their corresponding buildings.

Other objects, uses and advantages of the present invention will become apparent as the description proceeds.

The invention operates on a principal which may be concisely stated as follows; adding a mass of water to the exhaust jet of an engine decreases the velocity and temperature of the jet. An enclosure is provided into which the exhaust jet of the engine is directed. Preferably, this enclosure is of cavity wall construction with the walls containing a reservoir of water. The enclosure is separated vertically by a platform located near the top thereof. The platform supports a venturi-shaped diffuser which extends vertically through the platform. This diffuser provides a tubular passage through which the exhaust jet passes. The platform is covered by water which enters the space above the platform through openings formed in the inner surface of the water-filled cavity walls near the top of the enclosure. The water level above the platform will adjust itself to be about even with the upper end of the diffuser. A cover plate tightly covers the top of the enclosure. This plate has an opening concentrically aligned with the diffuser through which opening a relatively short annular member extends. This member is preferably of a diameter somewhat less than the diffuser diameter but somewhat larger than the diameter of the engine's exhaust jet upon issuing from the nozzle.

The engine's exhaust nozzle is positioned directly above the annular member. The exhaust jet of the engine passes through the annular member and the venturi-shaped diffuser. As the jet passes through the neck of the diffuser it creates a powerful suction in the space between the platform and the cover plate, drawing the water which is on the platform into the diffuser. The suction draws a continuous supply of water from the cavity walls onto the platform and into the diffuser so long as the engine is operating. The large amount of water introduced into the exhaust jet in this manner greatly reduces the velocity and temperature of the jet. The sound power of the jet is thus effectively reduced since the sound power of a rocket engine exhaust jet is proportional to the 8th power of the jet velocity.

The mixture of the mass of water and exhaust gases emerges from the lower end of the diffuser as cooled exhaust gases, steam, and water drops, which mixture is discharged into the atmosphere through a discharge section. This section incorporates means for condensing the steam and separating the water from the mixture. This reclaimed water is collected and directed back into the cavity walls for reuse.

FIGURE 2 is a plan view of the suppressor shown in FIGURE 1.

FIGURE 3 is a longitudinal cross-sectional view taken through the suppressor of FIGURE 1.

FIGURE 4 is a cross-sectional perspective view of a portion of the deflector section of the suppressor with the cover plate removed for clarity.

FIGURE 5 is a cross-sectional view taken along line 5—5 of FIGURE 2.

FIGURE 6 is a cross-sectional perspective view of a portion of the discharge section of the suppressor.

FIGURE 7 is a cross-sectional view taken along line 7—7 of FIGURE 2 illustrating mass addition of water into an engine jet stream upon issuance from the engine's thrust nozzle and passage through a diffuser.

Figure 1:
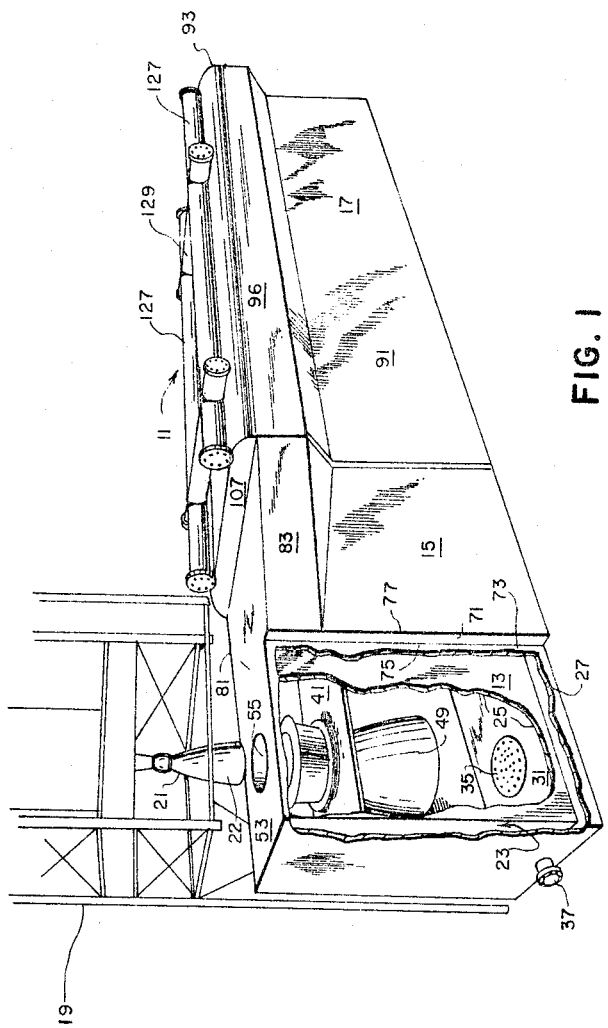
FIGURE 1 is a perspective view, with portions broken away, of a sound and heat suppressor embodying the present invention and showing a portion of a test stand supporting a rocket engine above the suppressor.

Referring to FIGURES 1 and 2, a sound and heat suppressor 11 comprises, generally, a deflector section 13, a duct or transition section 15 and a discharge section 17. The duct section 15 is slightly longer than the deflector section 13 and the discharge section 17 may be three to four times as long as the duct section.

Before describing the three sections of the suppressor in detail the function of each section and the relationship between the sections is broadly stated as follows:

A test stand 19 supports a rocket engine 21 having an exhaust nozzle 22 over the deflector section 13. The exhaust jet of the engine 21 enters the deflector section 13 where it is mixed with a mass of water which greatly reduces its velocity and temperature. The resultant mixture of exhaust gases, water and steam passes through the duct section 15 and into the discharge section 17 where it is discharged into the atmosphere. In the discharge section most of the water in the gaseous exhaust mixture is recovered and collected for reuse.

As shown in FIGURES 1 and 4, the deflector section 13 includes walls 23 with each wall having spaced inner and outer panels 25 and 27, respectively. The panels are water-tight and are closed at the top and bottom to form a closed container for water 29. A built-up floor 31 of the deflector section 13 incorporates a water-containing space 33 extending substantially the length and width of the floor. The space 33 communicates with the water-containing space in the walls 23. An impingement plate 35 having small holes 34 therein is mounted on the surface of the floor 31. A conduit 37 is joined to the plate 35 for spraying water upwardly through the holes 34. The walls 23 and the floor 31 of the deflector section are filled with water in any suitable manner such as through a conduit similar to conduit 37. It is believed beneficial to state at this point that walls of the duct section 15 and discharge section 17 are similar to the walls 23 of the deflector section to the extent that they are also water-containing cavity walls.

The walls of the three sections may be supported by open frame work (not shown) providing a continuous space capable of being filled with water through the inlet 39.

The deflector section 13 is separated vertically by a platform 41 comprising spaced panels 43 reinforced by spacers 45. Mounted in an opening 47 in the platform 41 directly above the impingement plate 35 is a venturi-shaped diffuser 49 which provides a tubular passage for an engine's exhaust jet. The diameter of the diffuser 49 diverges below and above the platform 41 terminating at the upper end in a circumferential overhanging lip 51.

The top of the deflector section 13 is closed tightly by a cover 53 (see FIGURES 3 and 7) forming a space 54 between the platform 41 and the cover 53. An annulus 55 having a flared upper end 57 is supported by the cover 53 and extends through an opening 59 in the cover in concentric alignment with the diffuser 49. The annulus 55 is of smaller diameter than the neck of the diffuser and extends below the cover 53 to a point substantially coincident with the upper end of the diffuser 49. The engine 21 is supported directly above the annulus 55 in alignment therewith, the exit end of the engine's nozzle being approximately the same diameter as that of the annulus.

Extending vertically within the walls of the deflector section 13 are conduits (see FIGURE 4) which open at 63 into the space 54 between the platform 41 and the cover 53. Completing the enclosure of the space 54 is a plate 65 positioned where the deflector section 13 meets the duct section 15.

Referring to FIGURE 5, the duct section 15 has a floor 69 between side walls 71 which walls join to the walls 23 of the deflector section at 73 in a water-tight manner. The walls 71 comprise panels 75 and 77 which are spaced further apart than the panels 25 and 27 of walls 23 and, therefore, have a greater water holding capacity. Near the top of the duct section is a water-tight platform 79 positioned coplanar with the platform 41 of the deflector section and may be a continuation of the platform 41. The duct section is closed by a cover 81 which may likewise be a continuation of the cover 53 of the deflector section.

The side edges of the cover 81 project beyond the respective walls 71. Joined to each side edge of the cover 81 is an angular panel 83. The panel 83 is joined at its bottom side to the wall 71 forming a water-tight space 85 extending the length of the duct section (see FIGURE 1). The cross section of the enclosure 85 expands from minimum to maximum in the direction of the discharge section 17 into which it merges as will be explained hereinafter.

The discharge section 17 comprises a floor 89, side walls 91 and an end wall 93. The walls 91 and 93 include spaced water-containing panels 94 and 95, and the walls 91, except for their upper configuration, which will be described later, are a continuation of the walls 71 of the duct section 15. The upper portion 96 of each side wall 91 of the discharge section is of a generally curved configuration having an inner panel 97 presenting a convex surface and an outer panel 99. Each wall bends outwardly at 101 and then curves inwardly, terminating at 103. The space between the panels 97 and 99 gradually decreases as the walls curve inwardly at the top. Closely spaced holes 105, the function of which will appear as the description proceeds, extend through the curved panels 97 throughout the length of the discharge section. Except for grating or framework (not shown), as desired, the entire discharge section is open at the top providing a discharge outlet between the ends 103 of the side walls. As seen in FIGURES 1 and 5, the upper portion 96 of the side walls 91 of the discharge section join the angular panels 83 of the duct section 15, with the space between the panels 97 and 99 communicating with the space 85 of the duct section. The end of the discharge section which projects above the duct section is closed by a panel 107 (see FIGURE 1). The end wall 93 of the discharge section conforms at the top to the outer configuration of the upper wall portions 96.

A water tray 111 is mounted midway between the lower half of the wall portions 96 of the discharge section on a platform 113 supported by frame members 115 which extend between the platform and the side walls 91. The tray 111 has sides 119 which diverge upwardly from a bottom 121 to a maximum width slightly exceeding the distance between the upper ends 103 of the sidewalls 91. Spaced along the length of the tray 111 are water-carrying ducts 125 extending from the lower region of the tray downwardly to the side walls 91 of the discharge section.

The water tray 111 extends the full length of the discharge section. The bottom 121 of the tray is coplanar with the platform 79 of the duct section 15, and at the location where the discharge section meets the duct section the end of the water tray may merge into the water-containing space between the platform 79 and the cover 81 of the duct section.

Water-tight panels (not shown) are secured on both sides of the tray 111 where it merges with the platform 79 thereby closing the space between the platform and the cover 81 for containing water. The end of the tray 111 opposite the duct section is sealed off in a water-tight manner (not shown).

Water spray pipes 127 and 129 are mounted on top of the discharge section 17 bordering the sides and extending transversely, respectively, of the opening between the upper ends 103 of the wall portions 96. The pipes 127 and 129 have holes 131 directed toward the tray 111 for spraying water therein. The pipes 127 and 129 are supplied with pressurized water by vertical pipes 133 at one end of the suppressor under control of valves 135.

Having described the structure of one embodiment of the invention, the operation of this embodiment will now be described:

In operation, the exhaust jet 139 (see FIGURE 7) from the engine 21 passes through the annulus 55 into the diffuser 49. As the exhaust jet passes through the neck of the diffuser 49 it creates a powerful suction in the closed space 54 between the platform 41 and the cover 53 of the deflector section, drawing water 29 over the lip 51 of the diffuser into the exhaust jet. The suction produced by the exhaust jet passing through the diffuser pumps a continuous supply of water from the reservoir in the walls of the suppressor through the conduits 61 onto the platform 41.

Referring to FIGURE 7, the exhaust jet, denoted by mass $m_1$, enters the diffuser 49 with a velocity $v_1$. In the space between the diffuser and the annulus 55, a second mass, $m_2$ (water 29) is drawn into the diffuser with a velocity $v_2$. The exhaust jet gases and the water 29 mix as they flow along in the diffuser and when they arrive at the bottom of the diffuser they have merged into a gas-steam-water mixture of mass $m_1$ plus $m_2$ with a velocity $v$. No external forces act on this mixture, and viscous forces are negligibly small. Thus the impulse-momentum law, which states that the momentum entering the deflector section at the top must be equal to the momentum leaving the section at the bottom leads to the equation $$(1) \quad m_1v_1 + m_2v_2 = (m_1 + m_2)v$$

from which the exit velocity, $v$, is obtained as $$(2) \quad v = \frac{m_1v_1 + m_2v_2}{m_1 + m_2}$$

Typical jet velocity $v_1$ is in the order of 8,000 feet per second whereas the water velocity $v_2$ was found to be four feet per second. Consequently, even though $m_2$ is 10 to 15 times greater than $m_1$ the $m_2v_2$ momentum (40 to 60) is negligible compared to the $m_1v_1$ value of 8,000. This leads to simplification of Equation 2:

$$(3) \quad v = \frac{m_1v_1}{m_1 + m_2} = v_1 \frac{1}{1 + \frac{m_2}{m_1}}$$

If, for example, the ratio of water to gas, $m_2/m_1$, is equal to 9, the exit velocity is 1/10 of the jet velocity $v_1$, or 800 feet per second. Since the sound power of a rocket engine exhaust jet is proportional to the 8th power of the jet velocity, the sound generated by the downstream portion of the jet is reduced by a factor of $10^8$. Equation 3 thus shows the effectiveness of the principle utilized in this invention in reducing the sound through reduction of the jet velocity by mass addition. The larger the water mass added to the mass of the jet, the more the exit velocity is reduced.

The introduction of the water mass $m_2$ has a second and very beneficial effect of reducing the temperature of the exhaust jet. This reduces the gas volume to approximately 1/3 of its volume at the engine exit, and partially compensates for the volume of steam produced in vaporizing part of the entrained water (approximately 3%).

To protect the floor of the deflector section against overheating, water is sprayed upwardly through the holes 36 in the impingement plate 35 which is mounted directly under the diffuser 49.

The path of movement of the gas-steam-water mixture within the suppressor is illustrated by arrows shown in the various drawing figures.

From the deflector section 13 the gas-steam-water mixture flows through the duct section 15 into the discharge section 17. In the discharge section the mixture rises toward the atmosphere, passing around both sides of the water tray 111 developing a centrifugal force which causes the water in the mixture to impinge upon the curved panels 97 and flow through the holes 105 back into the walls 91 for reuse. The gas and steam mixture remaining passes around the bend formed by the panels 97 over the tray 111 and into the atmosphere. During this escape into the atmosphere the gas and steam mixture must pass through a water curtain formed by the spray from the pipes 127 and 129 into the tray 111. Part of the steam is thus condensed and collected in the tray where it passes through the ducts 125 into the walls 91 for reuse.

It is apparent from the preceding description that the invention provides a highly efficient means and method for suppressing sound and heat produced by reactive propulsion engines. The quantity of water utilized by the suppressor is pumped by the exhaust jet of the engine itself. Most of the water introduced into the exhaust jet is reclaimed for reuse by water separation and condensation processes. The cavity walls of the suppressor and the cavity floor of the deflector section thereof are cooled by the water contained therein.

Obviously many modifications and variations of the present invention are possible in light of the above teachings. It is, therefore, to be understood that within the scope of the appended claims the invention may be practiced other than as specifically described.

What is claimed is:

1. A device for suppressing sound and heat produced by the exhaust jet of reactive propulsion engines comprising:
   (a) a venturi-shaped passage for receiving an engine's exhaust jet upon issuance from the engine;
   (b) said passage having an entrance end and an exit end for the exhaust jet;
   (c) a walled deflector section;
   (d) the exit end of said passage opening into said deflector section;
   (e) means for supporting a reservoir of water adjacent said entrance end of said passage;
   (f) said means including a container having a periphery spaced from and extending around said entrance end of said passage;
   (g) a communication between said water and said entrance end of said passage whereby said water may be pumped into said passage by force exerted by the exhaust jet.

2. A device for suppressing sound and heat produced by the exhaust jet of reactive propulsion engines comprising:
   (a) a walled housing including a deflector section;
   (b) said deflector section being separated vertically by a platform having an opening therethrough;
   (c) a venturi-shaped tubular passage for receiving an engine's exhaust jet;
   (d) said passage extending through said opening in said platform and having an entrance end above said platform and an exit end below said platform;
   (e) a reservoir of water supported on said platform adjacent said entrance end of said passage and in communication therewith whereby water may be pumped from said reservoir into said passage by force exerted by an engine's exhaust jet.

3. A device as defined in claim 2 including a cover on said deflector section, said cover having an opening therethrough for admitting the exhaust jet of an engine, said opening in said cover being substantially aligned axially with said passage.

4. A device for suppressing sound and heat produced by the exhaust jet of reactive propulsion engines comprising:
(a) a walled housing including a deflector section;
(b) said deflector section being separated vertically by a platform having an opening therethrough;
(c) a tubular passage for receiving an engine's exhaust jet;
(d) said passage extending through said opening in said platform and having an entrance end above said platform and an exit end below said platform;
(e) a cover on said deflector section disposed in spaced relationship above said platform and above said entrance end of said passage;
(f) said cover having an opening therethrough substantially aligned vertically with said passage;
(g) an annular member extending downwardly from said cover and terminating in a transverse plane substantially coincident with that of said entrance end of said passage;
(h) said annular member being concentrically aligned with said passage and having a smaller diameter than said passage;
(i) water supported on said platform with the surface of said water being approximately coincident with the entrance end of said passage whereby said water may be pumped into said passage by force exerted by an engine's exhaust jet.

5. A device as defined in claim 4 including means for spraying water into the space directly under the exit end of said passage.

6. A sound and heat suppressor comprising:
(a) a housing having a plurality of angularly related cavity walls;
(b) said housing comprising a deflector section and a discharge section;
(c) said deflector section being separated vertically by a platform having an opening therethrough;
(d) a venturi-shaped passage for receiving an engine's exhaust jet;
(e) said passage extending through said opening in said platform and having an entrance end above said platform and an exit end below said platform;
(f) a cover on said deflector section disposed in spaced relationship above said platform;
(g) said cover having an opening therethrough substantially aligned vertically with said passage;
(h) an engine comprising an exhaust nozzle supported above said cover with said exhaust nozzle substantially aligned vertically with said passage;
(i) said cavity walls of said housing containing a reservoir of water;
(j) conduit means for permitting flow of said water from said walls onto said platform;
(k) means including an exhaust jet of said engine for pumping water from said walls onto said platform and into said passage;
(l) said discharge section communicating with said deflector section and having an outlet into the atmosphere;
(m) opposed cavity walls of said discharge section adjacent said outlet having concave inner surfaces;
(n) said surfaces having holes therein for separating water impinging on said surfaces when a gaseous mixture discharges into the atmosphere;
(o) a tray mounted in said discharge section between said surfaces;
(p) means for providing water spray above said tray whereby steam contained in a gaseous mixture discharging into the atmosphere may be condensed and precipitated into said tray for reuse.

7. A device for suppressing sound and heat produced by the exhaust jet of reactive propulsion engines comprising:
(a) a walled housing including a deflector section and a discharge section;
(b) said deflector section communicating with said discharge section;
(c) a tubular passage for receiving an engine's exhaust jet upon issuance from said engine;
(d) said passage having an entrance end and an exit end for said exhaust jet;
(e) means for supporting said passage with the exit end thereof opening into said deflector section;
(f) a wall of said housing containing a reservoir of water;
(g) a communication between said water and said entrance end of said passage whereby said water may be pumped into said passage by force exerted by the exhaust jet;
(h) said discharge section having an opening into the atmosphere and comprising means for separating and reclaiming water contained in a gaseous mixture discharging into the atmosphere.

8. A device for suppressing sound and heat produced by the exhaust jet of reactive propulsion engines comprising:
(a) a vertical tubular passage for receiving an engine's exhaust jet upon issuance from the engine;
(b) said passage having an upper entrance end and a lower exit end for the exhaust jet;
(c) a walled deflector section;
(d) said exit end of said passage opening into said deflector section;
(e) means for supporting a reservoir of water adjacent and in communication with said entrance end of said passage permitting suction of said water into said passage by force exerted by the exhaust jet;
(f) said means including a container having a peripheral wall extending exteriorly around said entrance end of said tubular passage thereby forming a space between said passage and said wall of said container;
(g) said peripheral wall of said container extending axially of said passage across the horizontal plane in which lies said entrance end of said passage whereby said peripheral wall may support a reservoir of water having a top surface substantially coextensive with said horizontal plane.

References Cited by the Examiner

UNITED STATES PATENTS

| | | | |
|---|---|---|---|
| 2,674,335 | 4/1954 | Lemmerman | 181—42 |
| 2,685,936 | 8/1954 | Brenneman et al. | 181—33 |
| 2,810,449 | 10/1957 | Coleman | 181—43 |
| 2,925,013 | 2/1960 | Santora et al. | 181—33 |
| 2,940,537 | 6/1960 | Smith et al. | 181—54 |
| 2,982,092 | 5/1961 | Keen | 181—33 |
| 3,001,451 | 9/1961 | Urban et al. | 181—33 |
| 3,001,452 | 9/1961 | Urban et al. | 181—33 |
| 3,011,584 | 12/1961 | Lemmerman et al. | 181—33 |
| 3,187,835 | 6/1965 | Smith | 181—33 |
| 3,208,552 | 9/1965 | Seifert | 181—33 |

FOREIGN PATENTS 638,954  6/1950  Great Britain.

RICHARD B. WILKINSON, *Primary Examiner.*

LEO SMILOW, LOUIS J. CAPOZI, *Examiners.*

R. S. WARD, *Assistant Examiner.*